INVENTORS
Jack A. McCullough
George F. Wunderlich
Paul D. Williams

BY Leon F. Herbert
ATTORNEY

May 10, 1960

J. A. McCULLOUGH ET AL 2,935,783

METHOD OF MAKING ELECTRON TUBES

Filed Sept. 19, 1957

INVENTORS
Jack A. McCullough
George F. Wunderlich
Paul D. Williams

BY Leon F. Herbert
ATTORNEY

May 10, 1960     J. A. McCULLOUGH ET AL     2,935,783
METHOD OF MAKING ELECTRON TUBES
Filed Sept. 19, 1957     5 Sheets-Sheet 4
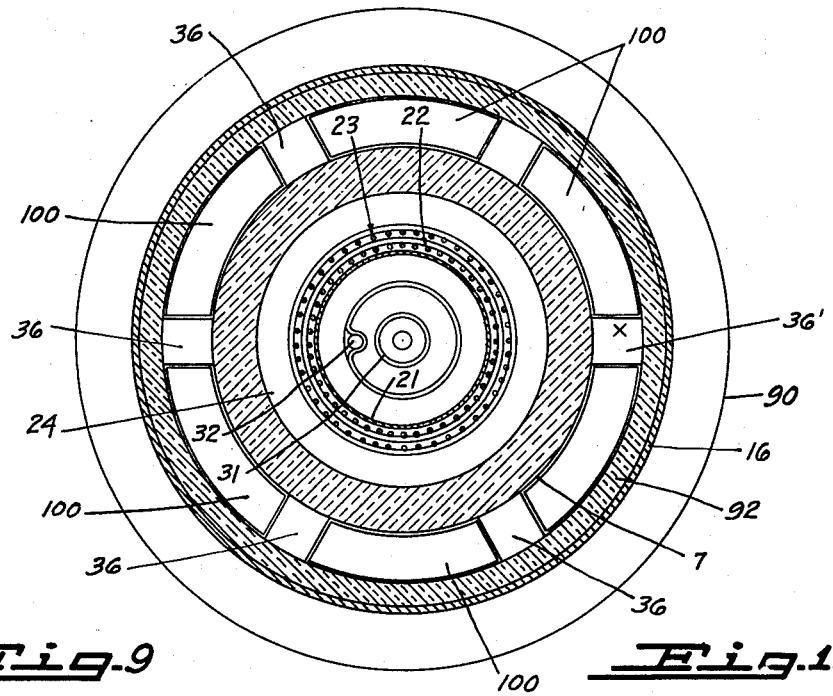
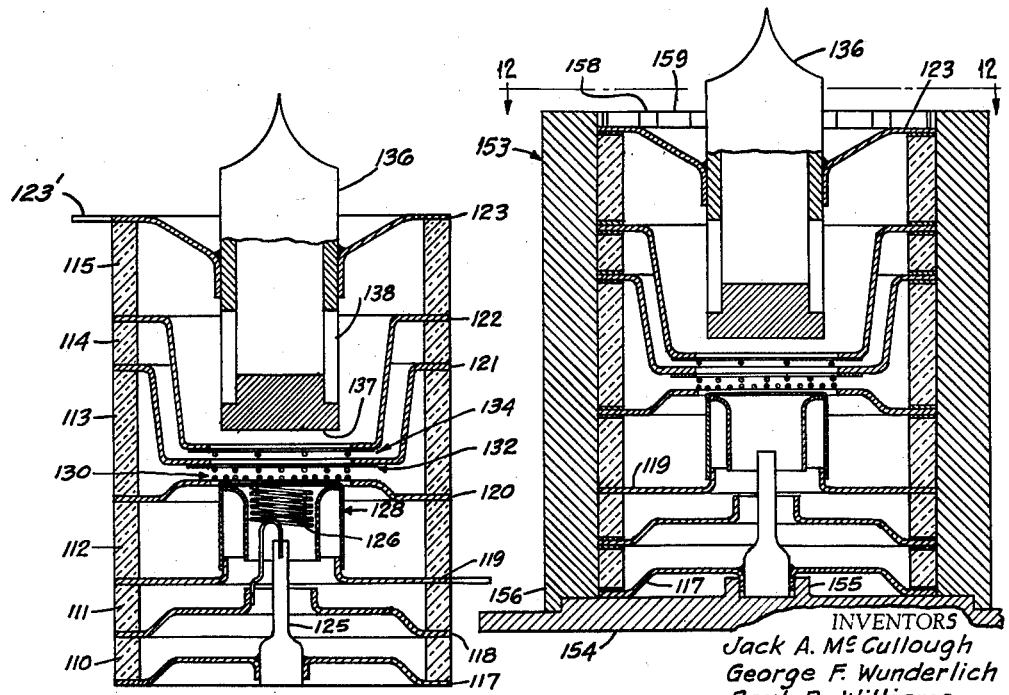
INVENTORS
Jack A. McCullough
George F. Wunderlich
Paul D. Williams
BY Leon F. Herbert
ATTORNEY

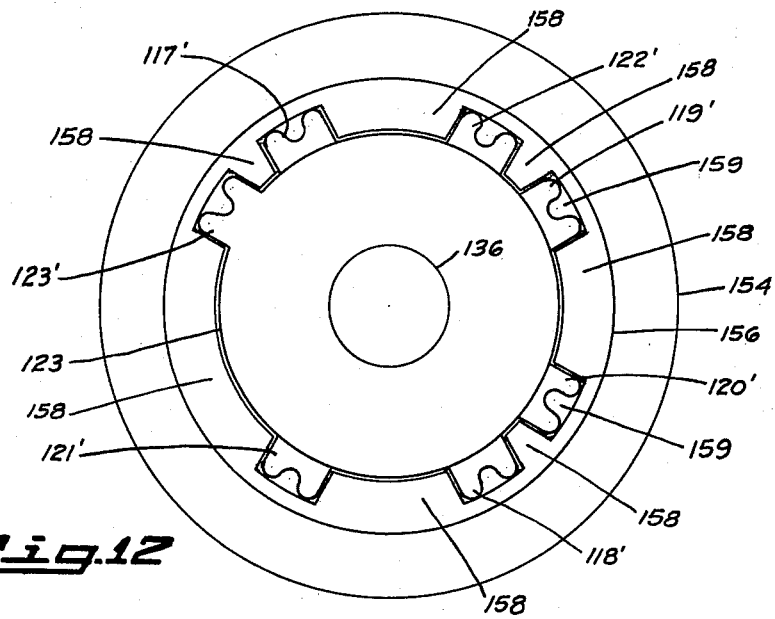
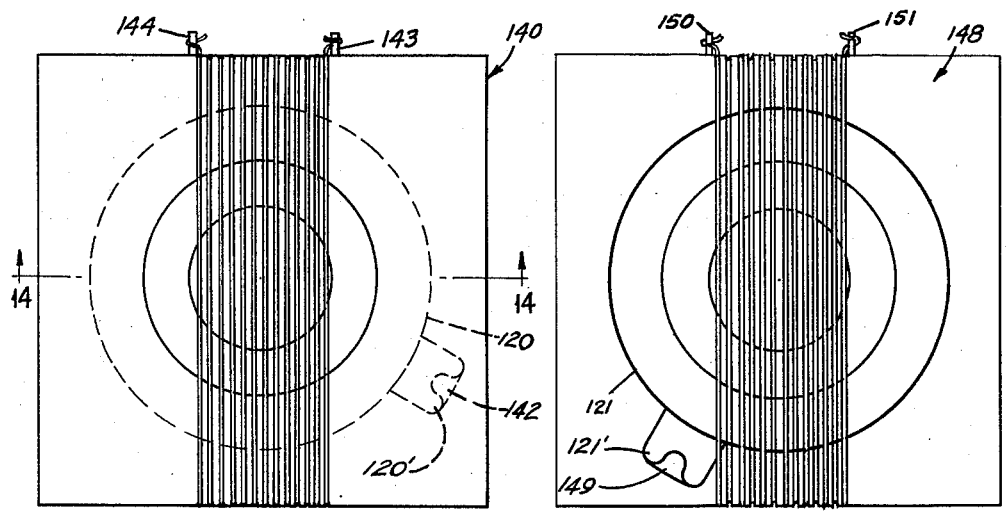
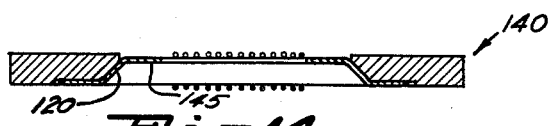

United States Patent Office 2,935,783
Patented May 10, 1960

2,935,783

METHOD OF MAKING ELECTRON TUBES

Jack A. McCullough, Los Altos, George F. Wunderlich, Burlingame, and Paul D. Williams, Menlo Park, Calif., assignors to Eitel-McCullough, Inc., San Bruno, Calif., a corporation of California Application September 19, 1957, Serial No. 684,982

8 Claims. (Cl. 29—25.16)

This invention relates to a method of making electron tubes and more particularly to a method of obtaining predetermined orientation of two or more electrodes relative to each other.

The most common tube construction in which predetermined orientation is utilized between two electrodes is the case where two concentric cage type wire grids are oriented so that the bars of the outer grid are in radial alignment with those of the inner grid. Although the invention is applicable in obtaining predetermined orientation of electrodes other than grids, the familiar orientation of grids will be used as a specific example.

In the past one method of radial alignment of cage type grids was to visually inspect the actual grid bars while moving one grid relative to the other until it appeared to the eye that alignment had been achieved. Another method was to use a jig arrangement which provided fingers or pins extending radially through the grids in contact with the grid bars. It is believed to be obvious that in both of these prior methods it is necessary to have access to the grid bars in order to accomplish alignment. In some tube construction this access is not readily available because of arrangement of the parts, and in all cases this need for access prevents complete assembly of the tube at the time alignment is obtained.

An object of the present invention is to provide an improved method of obtaining predetermined orientation of two or more electrodes relative to each other. More specifically, an object of the invention is to provide a method of assembling electron tubes which accomplishes orientation of electrodes even though the entire tube envelope is in place so that there is no access to the electrodes to be orientated. Briefly, the improved method of the invention accomplishes orientation of the electrodes by first orienting the electrodes relative to their respective supports, and then orienting the supports by adjustment of those portions of the supports which project outside the tube envelope. In this manner orientation of electrodes can be accomplished without physical or visual access to the actual grids.

A further object of the invention is to provide a method of assembling ceramic type electron tubes which accomplishes simultaneous orientation of electrodes and jigging of the various sections of the tube envelope.

Another object of the invention is to provide a fast, inexpensive and accurate method of making electron tubes of the type having predetermined orientation of two or more electrodes relative to each other.

The invention possesses other objects and features of advantage, some of which, with the foregoing, will be set forth in the following description of the invention. It is to be understood that the invention is not limited to the disclosed species, as variant embodiments thereof are contemplated and may be adopted within the scope of the claims.

Referring to the drawings:

Figure 9 is a cross-section along the line 9—9 in Figure 8;

Figure 10 is a cross-section of a different type of electron tube made by the invention;

Figure 11 is a cross-section of an assembly jig and various parts of the tube of Figure 10 assembled therein;

Figure 12 is a top view of Figure 11;

Figure 13 is a plan view of a jig for attaching planar grid wires to a grid support and shows the control grid support of Figure 10 positioned in the jig.

Figure 14 is a cross-section along the line 14—14 in Figure 13; and

Figure 15 is a plan view similar to Figure 13 showing a jig for the screen grid of Figure 10.

Figure 1:
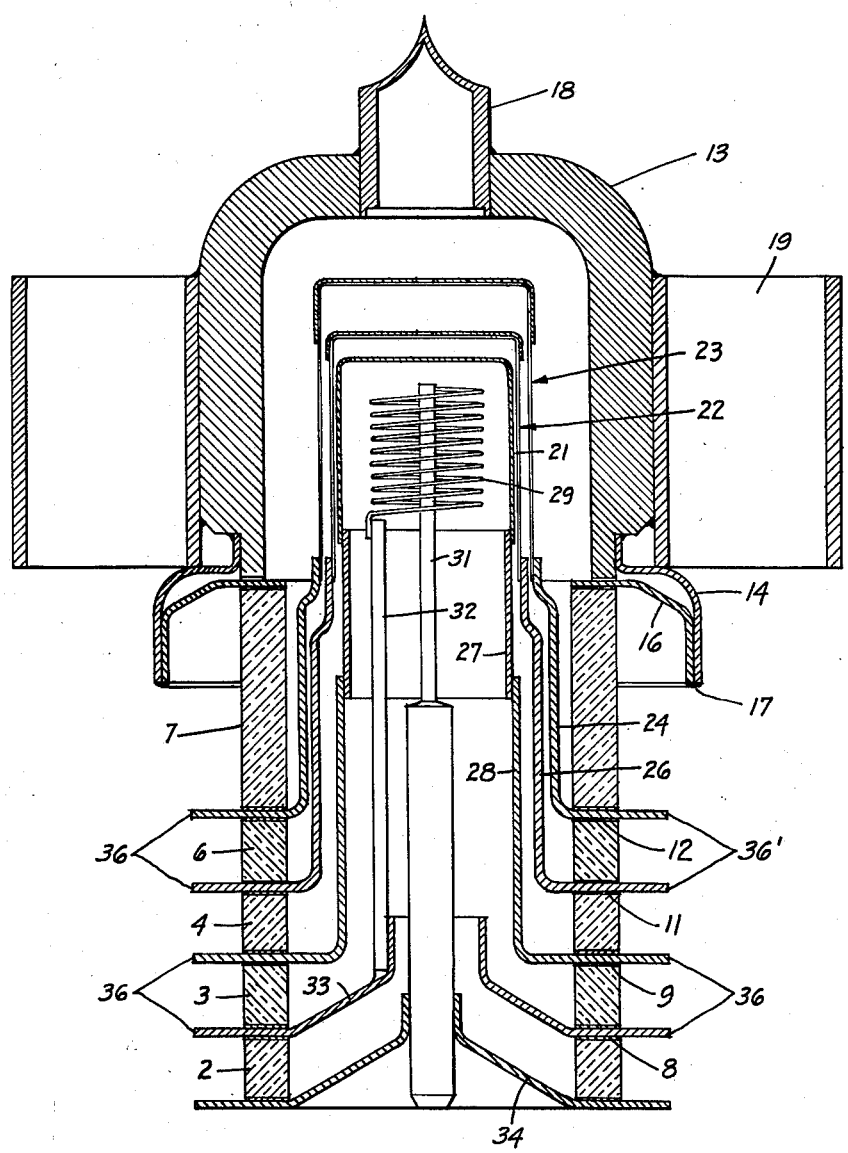
Figure 1 is a cross-section of a completed electron tube which was made by the inventor.

Referring first to Figure 1, a tube which has been manufactured by the method of this invention will be described in its completely finished form. The evacuated envelope of the tube is of generally cylindrical shape having a side wall comprising a stack of five ceramic rings 2, 3, 4, 6 and 7 with four flat metal rings 8, 9, 11 and 12 sandwiched therebetween. The ceramic is preferably a highly refractory body, such as alumina, the ceramic rings being metallized at both ends by a suitable metallizing procedure such as the molybdenum-manganese powder sintering process. The interposed metal rings are quite thin, say about .020 inch thick, and are of good electrical conductivity such as copper. These sandwiched parts are brazed together using high temperature brazing alloys such as copper-gold or the like.

The metallic bonds at the brazed joints form strong mechanical connections and also provide vacuum-tight seals so that the cylindrical side wall of the tube envelope is a solid impervious cylinder of rugged construction. The sandwiched metal rings in the side wall provide the desired lead-in conductors through the envelope, which rings perform the dual function of electrode anchoring supports and terminal members.

External anode 13 is of metal such as copper, preferably cup-shaped, and forms the upper portion of the envelope. It is supported on upper ceramic ring 7 of the side wall stack and is secured by the sealing flanges 14 and 16. These metal flanges are cup-shaped metal pieces, flange 14 being brazed to anode 13 and flange 16 being brazed to the upper metallized end of ceramic ring 7. After the remainder of the tube has been put together, the anode is placed in position over the other electrodes and the final seal is made by brazing together the registering edges of the flanges at metallic bond 17. Anode 13 also preferably carries the exhaust tubulation 18 and a suitable finned cooler 19.

Other electrodes in the envelope, including cathode 21, control grid 22, and screen grid 23, are coaxial electrodes projecting upwardly into anode 13. Cathode 21 is preferably of the oxide coated type, and grids 22 and 23 are of wire cage construction. All of these electrodes derive their support from the metal side wall rings. Thus, screen grid 23 is mounted on a tubular support 24 connected to upper ring 12; control grid 22 is mounted on a similar support 26 connected to ring 11; and cathode skirt 27 is mounted on tubular support 28 connected to ring 9. All these electrode supports are preferably formed integrally with the associated side wall rings so that these parts may be stamped or drawn as unitary structures from sheet metal.

A suitable heater is provided for the cathode, preferably comprising a heater coil 29 having one end connected to a center rod 31 and the other end to a side rod 32. The latter is anchored to a conically shaped support 33 formed as part of the lower side wall ring 8. Center rod 31 has an enlarged lower portion extending through and brazed to a conically shaped lower wall 34 of the envelope, which wall is a disk-like metal part brazed at the periphery to the metallized end of lower ceramic ring 2.

Figure 8:
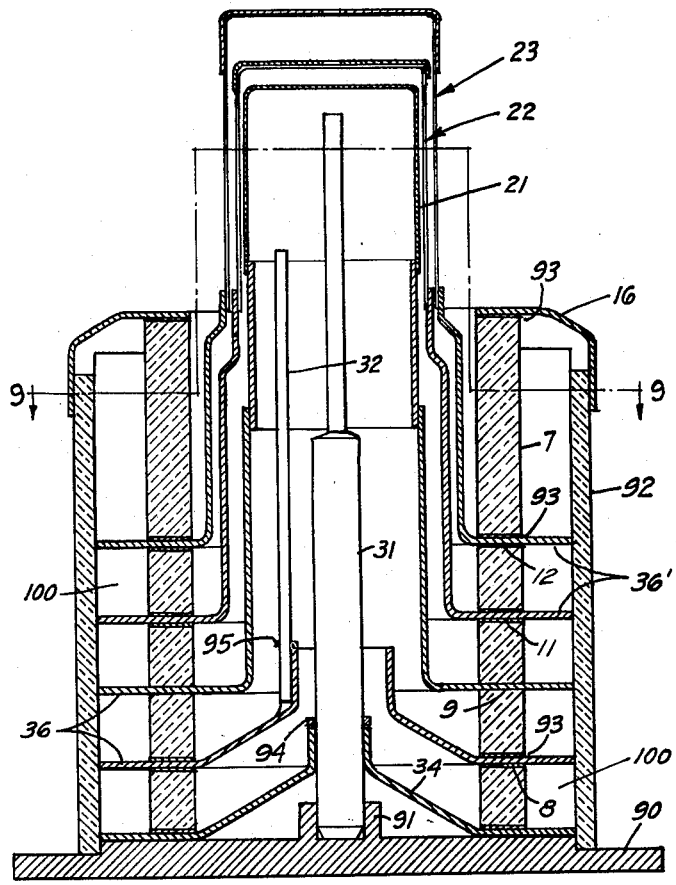
Figure 8 is a cross-section of an assembly jig and various parts of the tube of Figure 1 assembled therein.

The construction of the grids 22 and 23 will now be described in more detail. Both grids involve the same inventive principle of fabrication and differ only in size. Accordingly, only the screen grid 23 is shown in detail in Figures 2 and 3 wherein it will be noted that the flat ring portion 12 of grid support 24 carries a plurality of tabs 36, which tabs project externally of the tube envelope as shown in Figures 1, 8 and 9. Such tabs have been previously employed for the sole function of providing electrode terminals. In this terminal function tabs 36 are employed on all of the electrode rings 8, 9, 11 and 12. As regards the present invention, however, it will be noted in Figure 2 that one of the screen grid tabs is designated 36' and carries an indexing mark, such as the X designated by the numeral 38, for a purpose to be hereinafter described. Screen grid 23 comprises a plurality of vertically extending grid elements or wire rods 39 arranged in a circle. The lower ends of the rods are spot-welded to the support cylinder 24 and the upper ends of the rods are spot-welded to a cap 40 which has a central aperture 41.

Figure 2:
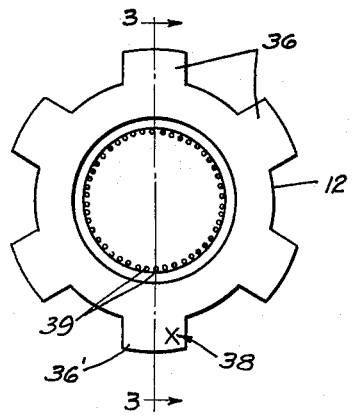
Figure 2 shows on reduced scale a top view of the screen grid and grid support in Figure 1.
Figure 3:
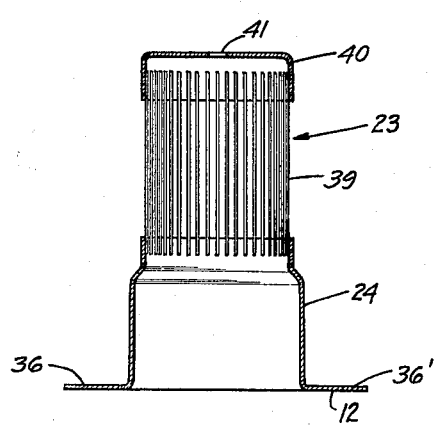
Figure 3 is a cross-section along the line 3—3 in Figure 2.

Referring to Figure 2 it will be noted that one of the wire rods 39 is located on a radius line passing through the center of the index tab 36'. Control grid 22 has exactly the same number and angular spacing of grid wires as does the screen grid. In addition the control grid 22 has one of its grid wires located on a radial line which passes through the center of its indexing tab 36' (Figure 1) and that tab also carries an indexing X mark (not shown).

Figure 4:
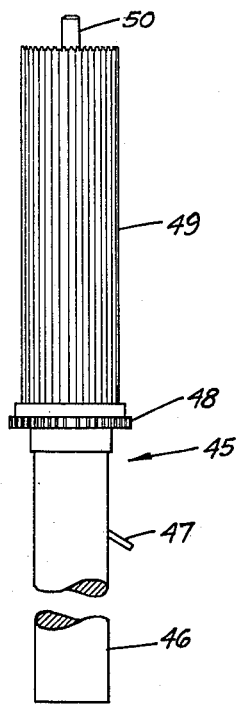
Figure 4 is a side view of a mandrel for winding grid wire.

The method of constructing grids 22 and 23 will now be described, together with a suitable jig for accomplishing the method. The method is exactly the same for both grids and will be described with particular reference to grid 23. Figure 4 shows a conventional mandrel 45 on which the grid wires are wound. Mandrel 45 comprises a stem 46 having a pin 47 to which one end of a continuous grid wire is attached. A grooved collar 48 is positioned on the mandrel adjacent pin 47. The main body 49 of the mandrel is grooved throughout its length and carries a center pin 50 at its upper end. The winding procedure is to attach one end of a continuous wire to pin 47, then run the wire along the length of the mandrel fixing it first in one of the grooves in collar 48 and then in the matching groove in body 49, next bind the wire across the end of body 49, run it down the other side of the body in a different groove, across collar 48 in a matching groove, under the lower end of collar 48, and back up the mandrel in the next adjacent groove in collar 48. This procedure is repeated until all of the grooves of body 49 have been filled with the grid wire.

Figure 5:
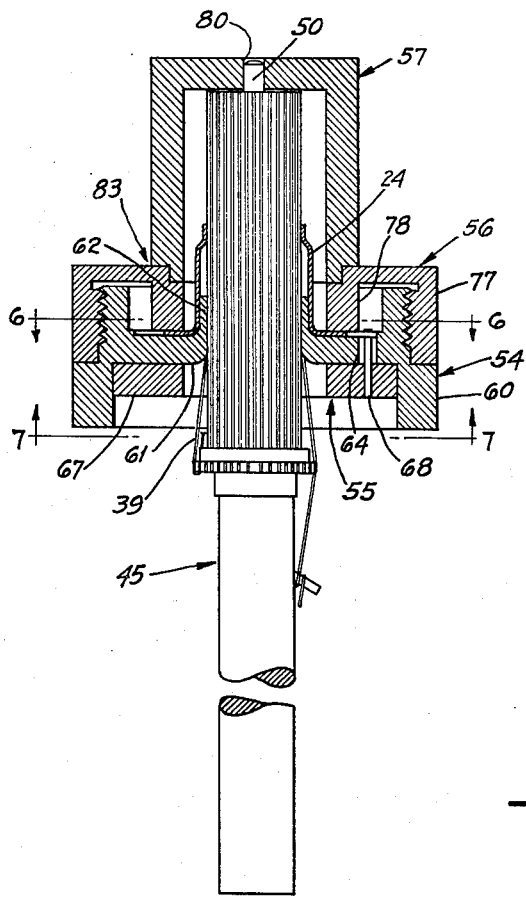
Figure 5 is a cross-section of a jig for mounting the screen grid wires in the screen grid support.
Figure 6:
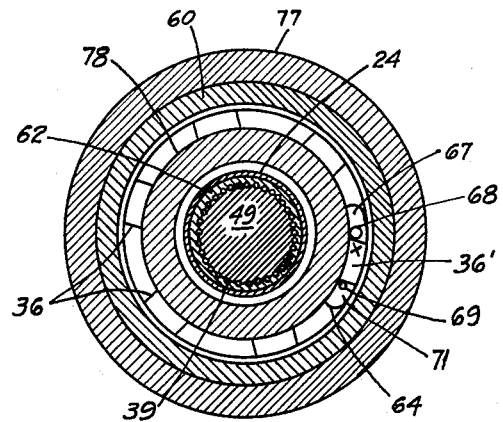
Figure 6 is a cross-section of the jig of Figure 5, taken along line 6—6.
Figure 7:
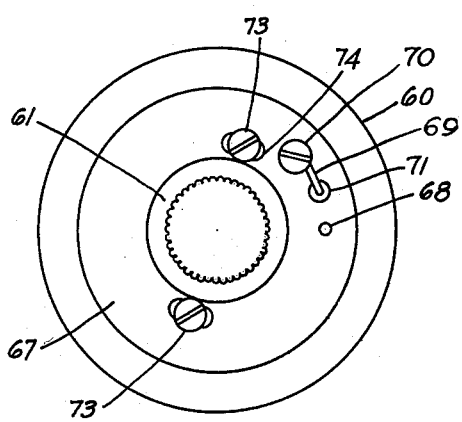
Figure 7 is a bottom view of the jig of Figure 5 with the mandrel removed.

Figures 5, 6 and 7 disclose a jig which is used in attaching the grid wires 39 to the grid support 24 in such a manner that one of the wires 39 will be located on the radial line passing through the center of indexing tab 36'. The jig comprises a cylindrical body member 54, an indexing member 55, a locking member 56, and a centering member 57.

Body member 54 comprises a generally cylindrical side section 60 which is externally threaded at its upper end. A ring section 61 extends inwardly from the side section, and a boss 62 extends upwardly from the center of the ring section. As shown in Figure 6 the inner periphery of ring section 61 and boss 62 is provided with grooves which match in number and angular spacing the grooves in body portion 49 of the mandrel. Ring section 61 also has an elongated arcuate slot 64 as shown in Figures 5 and 6, for a purpose to be hereinafter described.

Indexing member 55 comprises a ring-shaped body 67 having a pin 68 permanently mounted therein so as to extend upwardly into slot 64. As shown in Figures 6 and 7 the indexing member carries a spring wire 69 which is attached to the under surface thereof by screw 70 and extends upwardly therethrough in an enlarged aperture 71. The spring wire 69 extends into slot 64 to the same distance as the upper end of pin 68. As shown in Figure 7 the indexing member is attached to body member 54 by means of two screws 73 which extend through arcuate slots 74 in ring 67 and are screwed into threaded holes in the ring section 61 of body member 54.

The locking member 56 is generally channel-shape in cross-section having an outer threaded rim 77 and an inner abutment rim 78. The centering member 57 is a generally cup-shaped member having an aperture 80 to receive pin 50 on the mandrel. Centering member 57 is not permanently attached to locking member 56 but they are notched as at 83 to be self-centering.

The procedure for constructing the grids will now be described. A continuous grid wire is wound on mandrel 45 as previously explained. The jig is prepared by removing locking member 56 and centering member 57 from the side member 54. A grid supporting cone, 24 in the case of the screen grid, is placed in the body member 54 as shown in Figure 5 so that indexing tab 36' is held between pin 68 and spring wire 69, as shown in Figures 5 and 6. The wire 69 is biased toward the pin so that one edge of tab 36' is firmly held against pin 68. It will be understood that this arrangement insures that indexing tab 36' on each screen grid support 24 will in every case have the same position relative to the grooves in boss 62 on the body member 54. Screws 73 and adjustment slots 74 are provided so that the position of pin 68 in body member 54 can be rotatably adjusted. Thus it is possible to obtain accurately any desired predetermined position of the indexing tab 36' relative to the grooves in boss 62, for example, the predetermined position shown in Figure 2 wherein a radius line passing through the center of one grid wire also passes through the center of indexing tab 38. It will be understood that the jig for the control grid is exactly the same as the one for the screen grid except that it is slightly smaller in diameter.

After the grid support 24 has been inserted, the locking member 56 is threaded in place so that its abutment rim 78 holds the grid support firmly against the ring section 61 of body member 54. Having thus prepared the jig a wound mandrel is inserted from the bottom part way to the position shown in Figure 5. Next the centering member 57 is placed as shown in Figure 5 and the entire assembly is turned over with the apertured end of member 57 resting on a work surface. Then mandrel 45 is forced inwardly until stopped by member 57 in the position shown in Figure 5. For purposes of clarity only a few strands of the grid wires 39 are shown in Figure 5 but it will be understood that in practice each of the grooves in the mandrel body 49 carries a wire strand. The grooves in the mandrel are not deep enough to completely envelope the wire strands and the projecting portions thereof fit into the grooves in boss 62 so that the angular position of the mandrel within the boss is automatically obtained.

After the mandrel has been inserted as shown in Figure 5, centering member 57 is removed and the grid wires 39 are spot-welded to the reduced diameter portion at the upper end of grid support 24. Next the cap 40 is placed on the mandrel with pin 50 extending through aperture 41. Each of the grid wires 39 is then spot-welded to cap 40. Then the lower ends of all of the grid wires are broken away from the mandrel at a position slightly above collar 48. It is now possible to withdraw the mandrel from the bottom of the jig. After this is done locking member 56 is removed, and the grid support 24 with grid wires attached can be lifted out of the jig. The loose lower ends of the grid wires are then broken at a position just below their spot welds at the upper end of grid support 24. Similarly, the transverse portions of the wires within cap 40 are broken away just above their spot welds at the rim of the cap.

It will be understood that by use of the method just described it is possible to make a plurality of control grids and screen grids all having exactly the same angular orientation of their grid wires with respect to their indexing tabs 36', so that if the indexing tab on a screen scrid is placed directly above the indexing tab on a control grid each wire in the screen grid will be in radial alignment with a wire in the control grid.

The cathode and jig for assembling the tube in a manner which accomplishes grid alignment by means externally of the envelope will now be described. As shown in Figure 8 the assembly jig comprises a base plate 90 having an apertured central boss 91 and a cylindrical side section 92 co-axially seated on base plate 90. The assembly procedure is simply to drop into the jig each of the ceramic and metal rings as shown in Figure 8, starting with metal ring 34 and ending with ceramic ring 7. The center rod 31 and likewise side rod 32 are inserted prior to inserting metal ring 9 which carries the cathode cam 21. During this assembly a brazing ring 93 is positioned between each ceramic and metal ring, except that where an oxide coated cathode is used brazing rings are omitted from both sides of cathode ring 9. Brazing rings 94 and 95 are slid down over rods 31 and 32, respectively.

Since metal rings 8 and 9 do not carry an indexing tab the orientation of their terminal tabs 36 within the jig is not important during assembly. However, it is important that indexing tabs 36' on both of the grid rings 11 and 12 are placed approximately one above the other.

After all of the ceramic and metal rings have been inserted in the jig, elongated arcuate spacing keys 100 are inserted in the jig so that the two indexing tabs 36', and incidentally the terminal tabs 36, are lined up directly one above the other. Finally the sealing flange 16 is positioned as shown in Figure 8 and the entire assembly is passed through a brazing furnace after which the envelope can be separated at cathode ring 9 to permit attachment of the heater coil 29 and the coating of cathode 21. After these steps have been taken the parts are re-assembled with a brazing ring on each side of cathode ring 9, and a local radiation braze made at ring 9. Finally the anode assembly is moved into place so that its sealing flange 14 slides over sealing flange 16 and a final local braze or weld is made at 17 as shown in Figure 1.

Although the arrangement shown in Figure 8 would in fact permit access to the grids, the method described obviously does not require such access, and if desired, the anode 13 could be positioned on the tube at the time the grids are being aligned and could be sent through the brazing furnace with the jig as in the case of Figure 11. However, it is desired to point out that the present invention is advantageous even in situations where the grids are exposed during alignment. One advantage is that a very simple jig can accomplish simultaneous jigging of envelope parts and alignment of grids. Another advantage is that alignment externally of the tube has a feature of inherent accuracy; that is, indexing tabs 36' are substantially further away from the center of the tube than are the grid wires so that slight misalignment of the tabs is not even detectable at the shorter radius position of the actual grid wires.

Having thus described the invention in connection with an electron tube having cylindrical grids, it will now be described in connection with a tube having planar grids. The completed planar tube is shown in Figure 10 and has an envelope comprising six ceramic rings 110–115 and seven metal rings 117–123. The ends of the ceramic rings are metallized and are brazed to the metal rings as described in connection with Figure 1. Metal ring 117 provides an end closure for the tube and has a central aperture in which a supporting pin 125 for the heater 126 is brazed. Metal ring 118 serves as a lead for the other end of the heater coil. Metal ring 119 provides a support for the cathode structure 128. Metal ring 120 provides a support for the control grid 130. Metal ring 121 provides a support for the screen grid 132. Metal ring 122 provides a support for suppressor grid 134. Metal ring 123 provides a closure for the upper end of the tube and has a central aperture in which an exhaust tubulation 136 is brazed. The inner end of the exhaust tubulation has a solid plug 137 forming an anode surface and is also provided with slots 138 forming exhaust passages.

The method of fabricating the grids for the planar tube will now be described in connection with Figures 13 and 14 showing jig 140 which serves also as a mandrel. Jig 140 has a central aperture which is shaped to receive the control grid supporting ring 120. It will be noted in Figures 10, 11 and 12 that each of the metal rings carries a terminal tab which extends externally of the envelope. These tabs are numbered 117' through 123' corresponding to their respective rings 117—123. In Figure 13 it will be noted that the underside of jig 140 has a recess 142 which receives terminal tab 120' on the control grid support ring 120. The sides and top surface of jig 140 are grooved to receive a continuous grid wire, and one side of the jig carries pins 143 and 144 to which the ends of the grid wire may be attached.

The grid is fabricated in the following manner. Support ring 120 is inserted into the jig as shown in Figure 14 with its terminal tab 120' received in recess 142 as shown in Figure 13. Next the grid wire is wound around the jig with the various strands of wire being positioned in the grooves in the jig. After such winding is completed the wires are brazed to the rim 145 of supporting ring 120. Finally the wires are broken away from the rim 145 just outside of their braze connection thereto. The completed grid can then be removed from the jig.

Figure 15 shows a jig 148 for the screen grid which is similar to jig 140 except that it is thicker and its central aperture is differently shaped so as to receive the deeper and differently shaped supporting ring 121 for the control grid. Also the location of its indexing slot 149 is different. Further it will be noted that Figure 15 shows the bottom view of jig 148 whereas Figure 13 shows the top view of jig 140. This difference is required in the interest of clarity because control grid support 120 is cupped upwardly as shown in Figure 10 while screen grid support 121 is cupped downwardly. Thus Figures 13 and 15 both show top views of the respective grid supports and it is thus made obvious that the positions of terminal tabs 120' and 121' in the jigs are the same as their positions in the tube as seen in Figure 12. Jig 148 has wire holding pins 150 and 151 and is employed to fabricate the suppressor grid in the same manner that jig 140 is employed to fabricate the screen grid, except that when the grid wire is wound on jig 148 alternate grooves are not used because the screen grid has fewer wires than the control grid as shown in Figure 10. It is believed obvious that the suppressor grid can be fabricated in the same manner as described for the screen grid.

Figures 11 and 12 show the planar type tube assembled in an assembly jig 153. Jig 153 comprises a base plate 154 having a central boss 155 which receives a downturned boss on metal ring 117. A cylindrical side member 156 is coaxially seated on the base plate 154. Instead of using loose keys 100 as in Figure 9 to orient the terminal tabs, keys 158 are integral with the side member 153 and are separated by grooves 159. Each groove is designed to receive a particular terminal tab, the specific arrangement of the terminal tabs being shown in Figure 12. If desired a notation can be made at the top of side member 153 adjacent each groove indicating which tab is to be received therein.

As in the case of a cylindrical electrode tube, the various pieces are placed one above the other in jig 153 starting with metal ring 117 and ending with metal ring 123, with a brazing ring between each of the ceramic and metal rings except in the case of metal ring 119 which supports the cathode. As in the case of the cylindrical type tube the loaded assembly jig 153 is passed through a brazing furnace and then the parts are separated at ring 119 to permit applying the cathode coating and affixing the heater coil 126. After these steps are performed the tube is reassembled and a local radiation braze is made at metal ring 119. If desired the exhaust tubulation 136 can be brazed to metal ring 123 prior to insertion in the assembly jig and if this procedure is followed a higher temperature brazing alloy is employed for the tubulation than is employed between the ceramic and metal rings.

In Figures 11 and 12 it will be noted that each of the metal rings 117—123 has only one terminal tab 117'—123' and that such tabs are not arranged vertically one above the other but are spaced around the periphery of the tube. By comparing Figures 13 and 15 with Figure 12 it will be noted that the angular orientations of terminal tabs 120' and 121' are exactly the same in the grid jigs 140 and 148 as they are in the assembly jig as viewed in Figure 12. Thus it will be obvious that when grids 130 and 132 are placed in the assembly jig their grid wires will be parallel one to the other. They will also be positioned one above the other because the grooves in jig 140 have exactly the same positions with respect to the center of that jig as the grooves in jig 148 have with respect to the center of jig 148.

It is desired to point out that not only does the method of making electron tubes according to the invention provide a fast and accurate means of obtaining orientation of electrodes but it also provides for axial alignment of the tube parts at the same time the rotative orientation of the electrodes is being obtained. In this connection it will be noted in Figures 8, 9, 11 and 12 that the inner surfaces of keys 100 and 158 cause axial alignment of the tube parts at the same time the side surfaces of the keys cause rotative orientation of the grids.

Although the invention has been described in connection with the use of terminal tabs as indexing means it should be understood that any portion of an electrode support which extends outside the envelope can be used as an indexing means. For example, instead of tabs, the tubes of Figures 1 and 10 might have continuous-ring type terminals; in which case the indexing could be accomplished by a notch in the periphery of the terminal ring of each electrode to be oriented cooperating with a key in the assembly jig.

Having thus described the invention, what is claimed as new and desired to be secured by Letters Patent is:

1. A method of making electron tubes of the type having an envelope enclosing two grids mounted on supports extending through the envelope, said method comprising the steps of forming said grip supports with indexing means on the portion thereof which is external to the envelope, forming one of said grids on one of said supports with the elements of said grid oriented to a predetermined position relative to the indexing means on said one support, forming the other of said grids on the other of said supports with the elements of said other grid oriented to a preternined position relative to the indexing means on said other support, assembling said supports and the intervening envelope parts, orienting said supports by means external to the tube to a position such that said indexing means have a predetermined position with respect to each other, and sealing the supports and the intervening envelope parts together while said supports are in said oriented position.

2. A method of making electron tubes of the type having an envelope enclosing two coaxial electrodes having predetermined angular orientation relative to each other and mounted on support rings extending through the envelope, said method comprising the steps of forming said electrodes on the support rings with each electrode being angularly oriented about its axis to a predetermined position with respect to an indexing means on the respective support ring, assembling said support rings and the intervening envelope parts, orienting the angular position of the support rings about their axes to a position such that the indexing means are in a predetermined position relative to each other, said angular positioning of the support rings being performed by means on the outside of the tube, and sealing said support rings to the intervening envelope parts while said support rings are in said oriented position.

3. A method of making electron tubes of the type having an envelope enclosing two cage type wire grids mounted on metal supporting rings which extend between ceramic envelope wall rings and are provided externally thereof with indexing means, said method comprising the steps of placing wires on mandrels, inserting said mandrels in said support rings so that one of the wires on each mandrel has a predetermined angular position relative to the indexing means on its respective support ring, attaching said wires to the support rings and then removing the mandrels, assembling said support rings and the adjacent ceramic envelope rings, orienting said support rings by means external to the tube to a position such that the indexing means on said support rings have a predetermined angular position relative to each other, said predetermined position of the indexing means being such that the wires of one of said grids are in radial alignment with the wires of the other of said grids, and bonding said support rings to the adjacent ceramic envelope rings while said support rings are in said oriented position.

4. A method of making electron tubes of the type having an envelope enclosing two planar type wire grids mounted on metal support rings which extend through the envelope and are provided externally thereof with indexing means, said method comprising the steps of inserting said support rings in mandrels and placing grid wires on said mandrels with said indexing means being angularly oriented in each mandrel at a predetermined position relative to the lines in which the grid wires lie on the mandrel, attaching said grid wires to said support rings and then removing the rings from the mandrels, assembling said support rings and the adjacent envelope parts, aligning the wires of one of said grids with the wires of the other of said grids by angularly orienting the indexing means on said support rings in a predetermined position with respect to each other, and sealing said support rings to the adjacent envelope parts while said support rings are in said oriented position relative to each other.

5. A method of making electron tubes of the type having an envelope enclosing two electrodes mounted on supports extending to the outside of the tube, said method comprising the steps of forming said electrode supports with indexing means on the portion thereof which is external to the envelope, forming one of said electrodes on one of said supports with the electrode being oriented to a predetermined position relative to the indexing means on said one support, forming the other of said electrodes on the other of said supports with said other electrode being oriented to a predetermined position relative to the indexing means on said other support, assembling said supports and the intervening envelope parts, orienting said supports by means external to the tube to a position such that said indexing means have a predetermined position with respect to each other, and bonding said supports and said intervening envelope parts together while said supports are in said predetermined position.

6. A method of making electron tubes of the type having an envelope enclosing two electrodes mounted on support rings which extend through the envelope wall and are provided externally thereof with terminal tabs, said method comprising the steps of forming one of said electrodes on one of said support rings with said electrode being rotatively oriented to a predetermined position with respect to one of the terminal tabs on said one support ring, forming the other of said electrodes on the other of said support rings with said other electrode being rotatively oriented to the same said predetermined position with respect to one of the terminal tabs on said other support ring, assembling said support rings and the intervening envelope parts with said one terminal tab on each of said support rings being aligned one with the other along a line parallel to the tube axis, said alignment being obtained entirely from the outside of the tube, and bonding said support rings and said intervening envelope parts together while said terminal tabs are in said aligned position.

7. A method of making electron tubes of the type having an envelope enclosing two electrodes mounted on support rings which extend through the envelope wall and are each provided externally thereof with a terminal tab, said method comprising the steps of forming one of said electrodes on one of said support rings with said electrode being rotatively oriented to a predetermined position with respect to the terminal tab on said one support ring, forming the other of said electrodes on the other of said support rings with said other electrode being rotatively oriented to a predetermined position with respect to the terminal tab on said other support ring, the first mentioned rotative orientation being different from the second mentioned rotative orientation, assembling said support rings and the intervening envelope parts with said terminal tabs being angularly spaced from each other around the tube by a predetermined amount, said angular spacing being obtained entirely from the outside of the tube, and bonding said support rings and said intervening envelope parts together while said terminal tabs are in said angularly spaced position.

8. A method of making electron tubes of the type having an envelope enclosing two electrodes mounted on supports extending to the outside of the tube, said method comprising the steps of forming said electrode supports with indexing means on the portion thereof which is external to the envelope, forming one of said electrodes on one of said supports with the electrode being oriented to a predetermined position relative to the indexing means on said one support, forming the other of said electrodes on the other of said supports with said other electrode being oriented to a predetermined position relative to the indexing means on said other support, assembling said supports and the intervening envelope parts, rotatively orienting said supports to a position such that said indexing means have a predetermined position with respect to each other and simultaneously coaligning the axes of said supports and said envelope parts, said orienting and coaligning being performed from the outside of the tube, and bonding said supports and said intervening envelope parts together while said supports are in said predetermined position.

References Cited in the file of this patent

UNITED STATES PATENTS

| | | |
|---|---|---|
| 2,601,025 | Jamieson et al. | June 17, 1952 |
| 2,699,516 | Diemer et al. | Jan. 11, 1955 |